(12) United States Patent
Mazgut

(10) Patent No.: US 11,929,671 B2
(45) Date of Patent: Mar. 12, 2024

(54) CURRENT-MODE CONTROL FOR MULTISTAGE INTERLEAVED RESONANT CONVERTERS

(71) Applicant: SEMICONDUCTOR COMPONENTS INDUSTRIES, LLC, Phoenix, AZ (US)

(72) Inventor: Roman Mazgut, Zilina (SK)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 81 days.

(21) Appl. No.: 17/646,944

(22) Filed: Jan. 4, 2022

(65) Prior Publication Data
US 2022/0345035 A1   Oct. 27, 2022

Related U.S. Application Data

(60) Provisional application No. 63/180,503, filed on Apr. 27, 2021.

(51) Int. Cl.
| | | |
|---|---|---|
| H02M 3/00 | (2006.01) | |
| H02M 1/00 | (2006.01) | |
| H02M 3/335 | (2006.01) | |

(52) U.S. Cl.
CPC ........... *H02M 3/01* (2021.05); *H02M 1/0019* (2021.05); *H02M 1/0043* (2021.05); *H02M 3/33571* (2021.05)

(58) Field of Classification Search
CPC ............. H02M 1/0019; H02M 1/0043; H02M 1/0058; H02M 3/01–015; H02M 3/33569–33576; H02M 3/33592
See application file for complete search history.

(56) References Cited

U.S. PATENT DOCUMENTS

| | | | | |
|---|---|---|---|---|
| 6,188,586 B1* | 2/2001 | Farrington | ........ | H02M 3/33571 |
| | | | | 363/40 |
| 2014/0009985 A1* | 1/2014 | Figge | ...................... | H02M 3/01 |
| | | | | 363/65 |

(Continued)

OTHER PUBLICATIONS

Yu et al., "Survey of resonant converter topologies," from 2018 Texas Instruments Power Supply Design Seminar, SLUP376, TI, 2018. (Year: 2018).*

(Continued)

*Primary Examiner* — Fred E Finch, III
(74) *Attorney, Agent, or Firm* — Dickinson Wright PLLC; Jonathan A. Schnayer

(57) ABSTRACT

Methods for operating an interleaved resonant power converter, and systems and apparatuses for power conversion. The method includes generating a first pair of complementary signals to drive a first stage of the interleaved resonant power converter. The method also includes generating a second pair of complementary signals to drive a second stage of the interleaved resonant power converter. The method further includes generating a current-mode control signal based on a current sense signal of the first stage. The method also includes adjusting a switching frequency of the first pair of complementary signals based on the current-mode control signal. The method further includes adjusting a switching frequency of the second pair of complementary signals to match the switching frequency of the first pair of complementary signals.

21 Claims, 11 Drawing Sheets

(56) References Cited

U.S. PATENT DOCUMENTS

| | | | |
|---|---|---|---|
| 2014/0268907 A1* | 9/2014 | Cinagrossi | H02M 3/33507 |
| | | | 363/21.02 |
| 2016/0072388 A1* | 3/2016 | Dubus | H02M 3/33571 |
| | | | 363/25 |
| 2018/0351459 A1* | 12/2018 | Liu | H03K 4/48 |

OTHER PUBLICATIONS

Yang, Bo, "Topology investigation for front end DC/DC power conversion for distributed power system," Ph.D. dissertation, Virginia Tech, Blacksburg, VA, 2003. (Year: 2003).*

Texas Instruments, "Design Guide, Two-Phase Interleaved LLC Resonant Converter Design with C2000TM Microcontrollers," TIDUCTA9A—Jan. 2017—Revised Mar. 2020.

NXP, " Product Data Sheet—TEA19161T/2 Digital controller for high-efficiency resonant power supply," Rev 2.1—May 18, 2021.

Kang-Hyun Yi, et al., "A simple and novel two phase interleaved LLC series resonant converter employing a phase of the resonant capacitor," IEEE Energy Conversion Congress and Exposition, copyright 2009.

\* cited by examiner

CURRENT-MODE CONTROL FOR MULTISTAGE INTERLEAVED RESONANT CONVERTERS

CROSS-REFERENCE TO RELATED APPLICATIONS

This application claims priority to and the benefit of U.S. Provisional Application Ser. No. 63/180,503, filed Apr. 27, 2021, titled "CURRENT MODE CONTROL FOR MULTI-STAGE INTERLEAVE RESONANT CONVERTER," the entire disclosure of which is hereby incorporated by reference for all purposes.

BACKGROUND

Resonant converters are widely used for middle-power applications. The LLC topology offers several advantages. However, single-stage variants of the LLC topology can be challenging for higher-power design applications (for example, server power supplies, high current charger, etc.). Consequently, multistage variants of the LLC topology are used for the design of higher-power supplies. A large output filter capacitance is required in high-current applications to achieve a low voltage ripple. The filter capacitance of a power converter can be significantly reduced by interleaving. That means all stages have same switching frequency and appropriate phase shift between them (e.g., the phase shift is 90° for two stages and the phase shift is 120° for three stages).

SUMMARY

Fast transient response is an important parameter of DC/DC power converters. Current-mode control is one strategy to improve transient response. Switching frequency is modulated based on primary current in conventional current-mode control of resonant converters. As was mentioned, same switching frequency of all stages is needed of interleaved LLC. However, gain characteristics of all stages may be slightly different in real-world applications because stages have mismatched components due to tolerance. Accordingly, independent control of individual stages using conventional current-mode control may result in stages having different switching frequencies. Therefore, independent control of stages is not suitable for interleaved LLCs.

The present disclosure provides a method for operating an interleaved resonant power converter. The method includes generating a first pair of complementary signals to drive a first stage of the interleaved resonant power converter. The method also includes generating a second pair of complementary signals to drive a second stage of the interleaved resonant power converter. The method further includes generating a current-mode control signal based on a current sense signal of the first stage. The method also includes adjusting a switching frequency of the first pair of complementary signals based on the current-mode control signal. The method further includes adjusting a switching frequency of the second pair of complementary signals to match the switching frequency of the first pair of complementary signals. The present disclosure also provides a system for power conversion. The system includes, in one implementation, an interleaved resonant power converter and a controller. The interleaved resonant power converter includes at least a first stage and a second stage. The controller is configured to generate a first pair of complementary signals to drive the first stage. The controller is also configured to generate a second pair of complementary signals to drive the second stage. The controller is further configured to generate a current-mode control signal based on a current sense signal of the first stage. The controller is also configured to adjust a switching frequency of the first pair of complementary signals based on the current-mode control signal. The controller is further configured to adjust a switching frequency of the second pair of complementary signals to match the switching frequency of the first pair of complementary signals.

The present disclosure further provides an apparatus for power conversion. The apparatus includes means for generating a first pair of complementary signals to drive a first stage of an interleaved resonant power converter. The apparatus also includes means for generating a second pair of complementary signals to drive a second stage of an interleaved resonant power converter. The apparatus further includes means for generating a current-mode control signal based on a current sense signal of the first stage. The apparatus also includes means for adjusting a switching frequency of the first pair of complementary signals based on the current-mode control signal. The apparatus further includes means for adjusting a switching frequency of the second pair of complementary signals to match the switching frequency of the first pair of complementary signals.

BRIEF DESCRIPTION OF THE DRAWINGS

For a detailed description of example implementations, reference will now be made to the accompanying drawings in which.

DEFINITIONS

Figure 1:
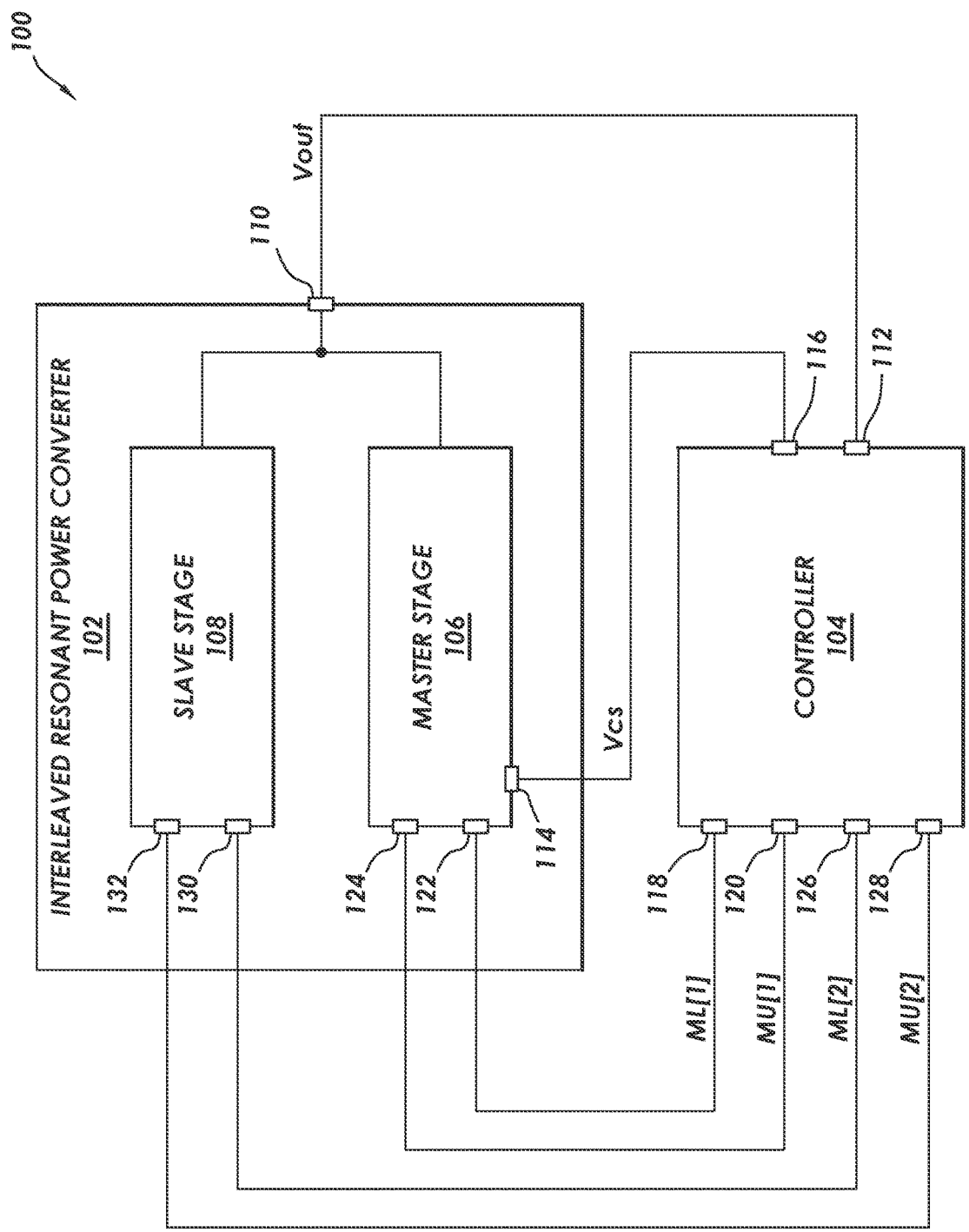
FIG. 1 is a block diagram of an example of a system for power conversion in accordance with some implementations.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a reduced-instruction-set computer (RISC), a digital signal processor (DSP), a processor with controlling software, a programmable logic device (PLD), or a field programmable gate array (FPGA), configured to read inputs and drive outputs responsive to the inputs.

"Multistage topology" shall mean a parallel combination of several LLC power converters.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to interleaved resonant power converters with current-mode control. More particularly, various examples are directed to interleaved resonant power converters and related controllers that modulate the master stage's switching frequency using current-mode control and modulate the slave stages' switching frequencies to match the master stage. The specification now turns to an example system to orient the reader.

FIG. 1 is a block diagram of an example of a system 100 for power conversion in accordance with some implementations. The system 100 illustrated in FIG. 1 includes an interleaved resonant power converter 102 and a controller 104. The interleaved resonant power converter 102 illustrated in FIG. 1 includes a master stage 106 and a slave stage 108. The system 100 illustrated in FIG. 1 is provided as one example of such a system. The methods described herein may be used with systems having fewer, additional, or different components in different configurations than the system 100 illustrated in FIG. 1. For example, the interleaved resonant power converter 102 may include more than one slave stage. In some implementations, the interleaved resonant power converter 102 and the controller 104 are separate components (as illustrated in FIG. 1). In alternate implementations, the interleaved resonant power converter 102 and the controller 104 may be part of the same component. For example, the interleaved resonant power converter 102 and the controller 104 may both be positioned on a single printed circuit board and/or within a single chip housing.

The interleaved resonant power converter 102 is configured to produce an output voltage Vout. The interleaved resonant power converter 102 includes a power terminal 110 which provides the output voltage Vout to reference terminal 112 of the controller 104. The master stage 106 includes a reference terminal 114 which provides a current sense signal Vcs to reference terminal 116 of the controller 104. The current sense signal Vcs represents the primary current of the master stage 106. As explained in more detail below, the controller 104 generates pairs of complementary signals to drive the master stage 106 and the slave stage 108. Also, as explained in more detail below, the controller 104 generates the pairs of complementary signals based on the output voltage Vout and the current sense signal Vcs. The controller 104 includes control terminals 118 and 120 to provide a pair of complementary signals (e.g., signals ML[1] and MU[1]) to control terminals 122 and 124 of the master stage 106. The controller 104 also includes control terminals 126 and 128 to provide another pair of complementary signals (e.g., signals ML[2] and MU[2]) to control terminals 130 and 132 of the slave stage 108. In some implementations, control terminals 118, 120, 126, and 128 of the controller 104 are galvanically isolated from control terminals 122 and 124 of the master stage 106 and control terminals 130 and 132 of the slave stage 108.

Figure 2:
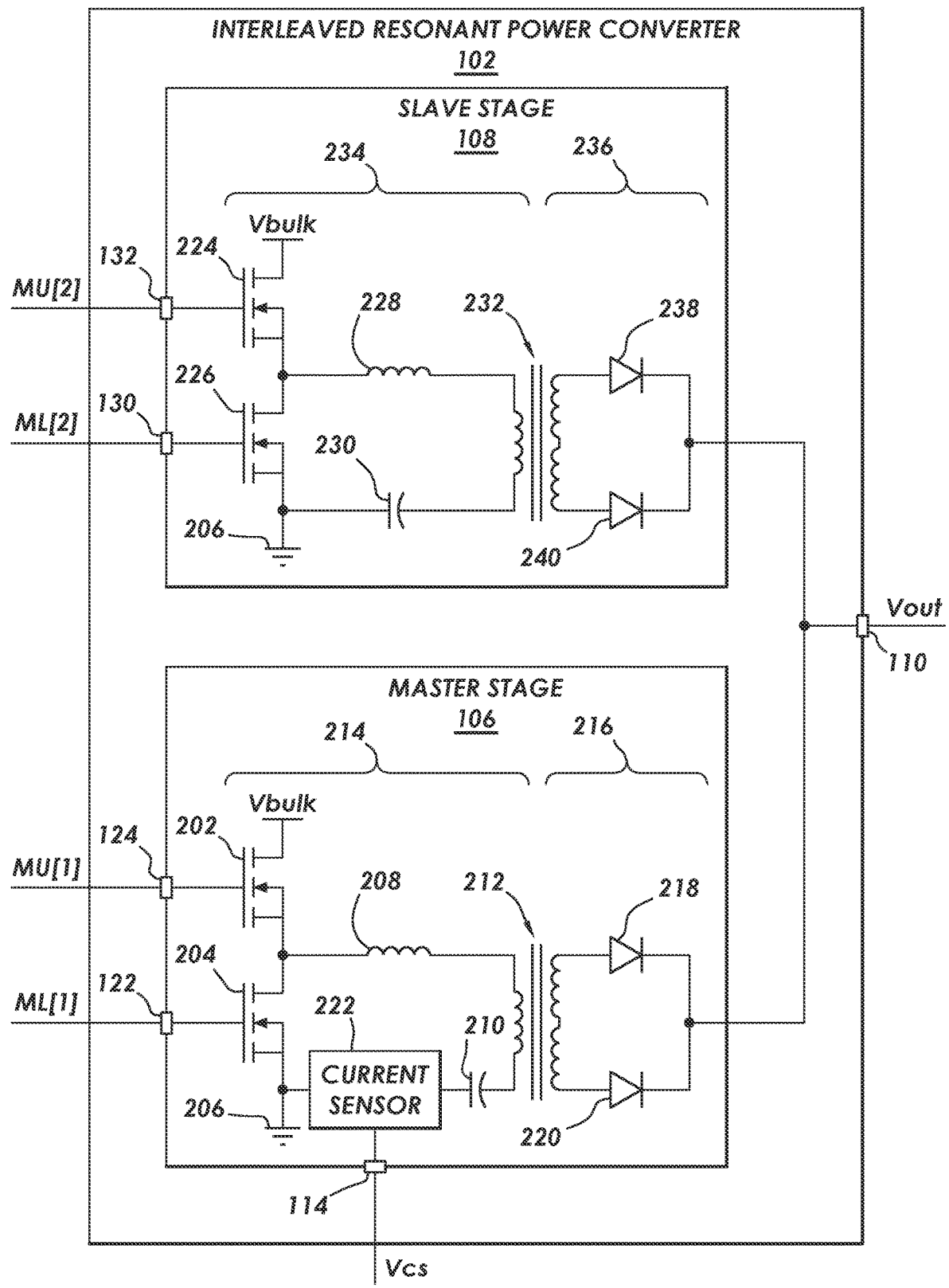
FIG. 2 is a partial schematic and a partial block diagram of an example of an interleaved resonant power converter included in the system of FIG. 1 in accordance with some implementations.

FIG. 2 is a partial schematic and a partial block diagram of an example of the interleaved resonant power converter 102 in accordance with some implementations. Turning first to the master stage 106, the master stage 106 illustrated in FIG. 2 includes a pair of transistors 202 and 204 that are coupled in a series configuration between input voltage Vbulk and ground terminal 206. The pair of transistors 202 and 202 are illustrated in FIG. 2 as metal-oxide-semiconductor field-effect transistors (MOSFETs), and in particular, N-channel MOSFETs. However, other types of FETs may be used (e.g., P-channel MOSFETs), and in fact other types of transistors may also be used (e.g., bi-polar junction transistors (BJTs)). The gate terminals of transistors 202 and 204 are coupled to control terminals 124 and 122, respectively, to receive signals MU[1] and MU[2] from the controller 104. The pair of complementary signals drive the pair of transistors 202 and 204 to generate a square wave input. The master stage 106 illustrated in FIG. 2 also includes an inductor 208 and a capacitor 210 that together form a resonant tank to filter the square wave input and generate a sinusoidal load current. The sinusoidal output current is galvanically isolated from the resonant tank by transformer 212. The resonant tank is positioned on the primary side 214 of transformer 212. On the secondary side 216 of transformer 212 is a pair of diodes 218 and 220 which rectify the sinusoidal load current to generate a direct current (DC) signal. The master stage 106 illustrated in FIG. 2 also includes a current sensor 222 to generate the current sense signal Vcs which is indicative of the current flowing on the primary side 214 of transformer 212. Primary current is measured using the current sensor 222. The output of the current sensor 222 is integrated to generate the current sense signal Vcs. The current sensor 222 is coupled to reference terminal 114 to provide the current sense signal Vcs to the controller 104. In some implementations, the current sensor 222 includes a current sense transformer and the output is integrated using a resistor-capacitor (RC) type of filter. In other implementations, the current sensor 222 includes a capacitor divider connected to a resonant capacitor of the master stage 106.

Turning now to the slave stage 108, the slave stage 108 illustrated in FIG. 2 includes a pair of transistors 224 and 226 that are coupled in a series configuration between input voltage Vbulk and ground terminal 206. The gate terminals of transistors 224 and 226 are coupled to control terminals 132 and 130, respectively, to receive signals MU[2] and ML[2] from the controller 104. The pair of complementary signals drive the pairs of transistors 224 and 226 to generate a square wave input. The slave stage 108 illustrated in FIG. 2 also includes an inductor 228 and a capacitor 230 that form a resonant tank to filter the square wave input and generate a sinusoidal load current. The sinusoidal output current is galvanically isolated from the resonant tank by transformer 232. The resonant tank is positioned on the primary side 234 of transformer 232. On the secondary side 236 of transformer 232 is a pair of diodes 238 and 240 which rectify the sinusoidal load current to generate a DC signal. The DC signals generated by the master stage 106 and the slave stage 108 are combined to produce the output voltage Vout at power terminal 110.

Figure 3:
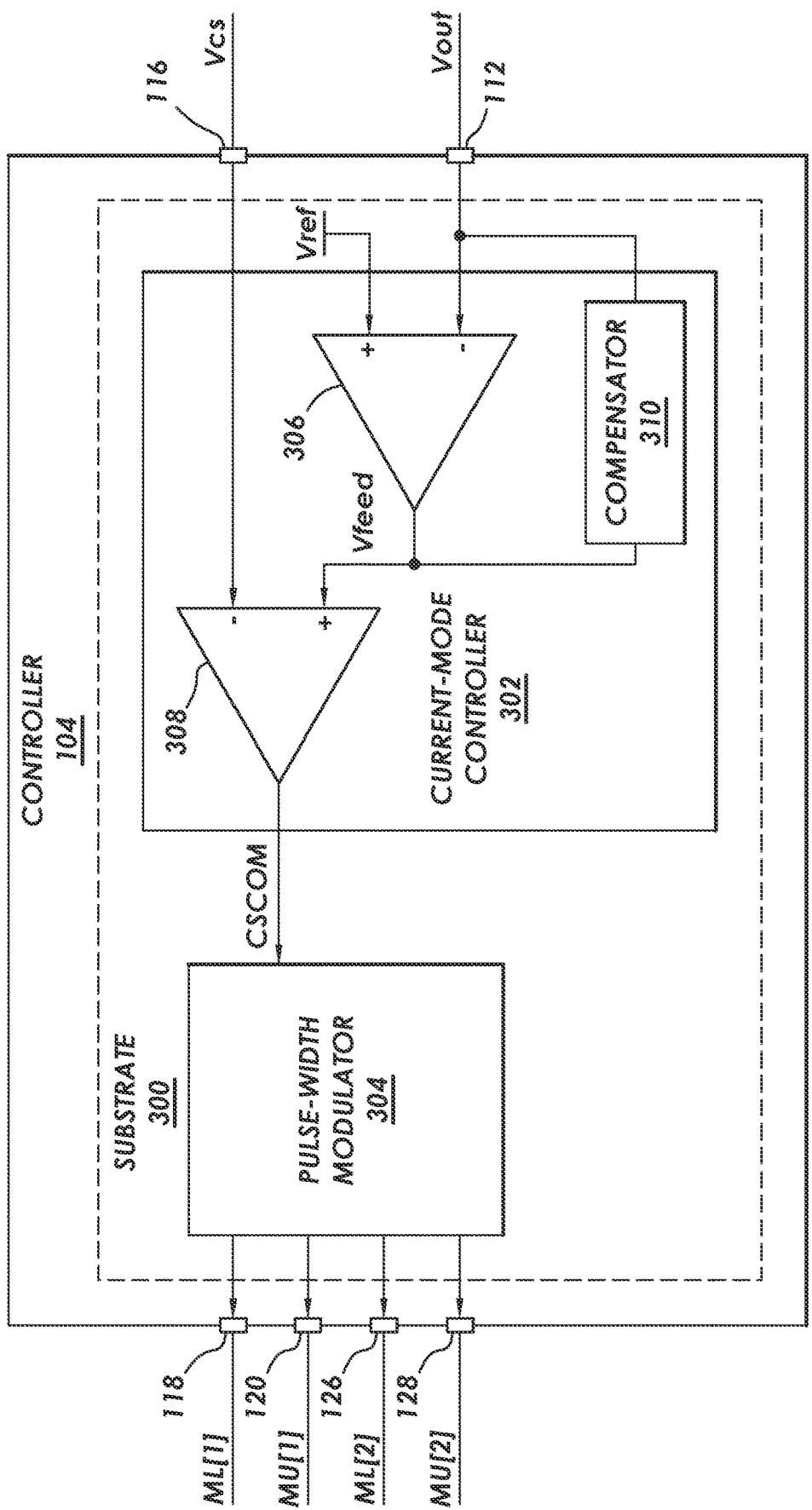
FIG. 3 is a block diagram of an example of a controller included in the system of FIG. 1 in accordance with some implementations.

FIG. 3 is a block diagram of an example of the controller 104 in accordance with some implementations. In particular, the controller 104 may comprise electrical devices and circuits monolithically created on a substrate 300 and encapsulated within packaging; however, the functionality of the various components may be embodied on multiple substrates that are co-packaged (e.g., multi-chip module) and electrically coupled to each other and coupled to the various terminals. The controller 104 illustrated in FIG. 3 includes reference terminals 112 and 116 and control terminals 118, 120, 126, and 128. The example terminals are electrical connections exposed and accessible through the packaging. Additional terminals will be present (e.g., power terminal, reference voltage terminal, ground terminal), but those additional terminals are not shown so as not to unduly complicate the figure. The functionality of the controller 104 described herein may be conceptually, though not necessarily physically, divided into a current-mode controller 302 and a pulse-width modulator 304.

Various functional components of the controller 104 implement current-mode control (e.g., current-mode controller 302). Current-mode controller 302 illustrated in FIG. 3 includes an error amplifier 306, a comparator 308, and a compensator 310. Reference terminal 112 is coupled to the inverting input of error amplifier 306 to provide the output voltage Vout thereto. The non-inverting input of error amplifier 306 is coupled to a reference voltage Vref. The output of error amplifier 306 is coupled to the inverting input of error amplifier 306 via the compensator 310. In some implementations, the compensator 310 includes a capacitor. Error amplifier 306 outputs a feedback voltage Vfeed (sometimes referred to as an error voltage). The output of error amplifier 306 is coupled to the non-inverting input of comparator 308 to provide the feedback voltage Vfeed thereto. Reference terminal 116 is coupled to the inverting input of comparator 308 to provide the current sense signal Vcs thereto. Comparator 308 outputs a current-mode control signal CSCOM that pulses when the voltage of the current sense signal Vcs substantially equals the feedback voltage Vfeed. For example, referring to the upper portion of FIG. 4, the current-mode control signal CSCOM pulses when the voltage of the current sense signal Vcs is equal the feedback voltage Vfeed.

Returning to FIG. 3, other various functional components of the controller 104 implement a pulse-width modulation (e.g., pulse-width modulator 304). As will be described in more detail below, the pulse-width modulator 304 generates signals ML[1], MU[1], ML[2], and MU[2] to drive the master stage 106 and the slave stage 108 of the interleaved resonant power converter 102. The pulse-width modulator 304 illustrated in FIG. 3 is coupled to control terminals 118 and 120 to provide signals ML[1] and MU[1] to the master stage 106. In addition, the pulse-width modulator 304 is coupled to control terminals 126 and 128 to provide signals ML[2] and MU[2] to the slave stage 108.

When a pair of complementary signals are switched, it is possible for both transistors in the associated stage to be turned on simultaneously, causing a short circuit from supply to ground. Thus, in some implementations, the controller 104 may further include a dead-time generator (not shown) to adjust the complementary signals such that both transistors are turned off for a short period of time when the complementary signals are switched. For example, to avoid having transistors 202 and 204 turned on simultaneously when signals MU[1] and ML[1] are switched, the dead-time generator may start by switching signal ML[1] from "1" to "0" and then wait a short period of time before switching signal MU[1] from "0" to "1". The dead-time generator may be positioned, e.g., between the pulse-width modulator 304 and control terminals 118, 120, 126, and 128.

Figure 5:
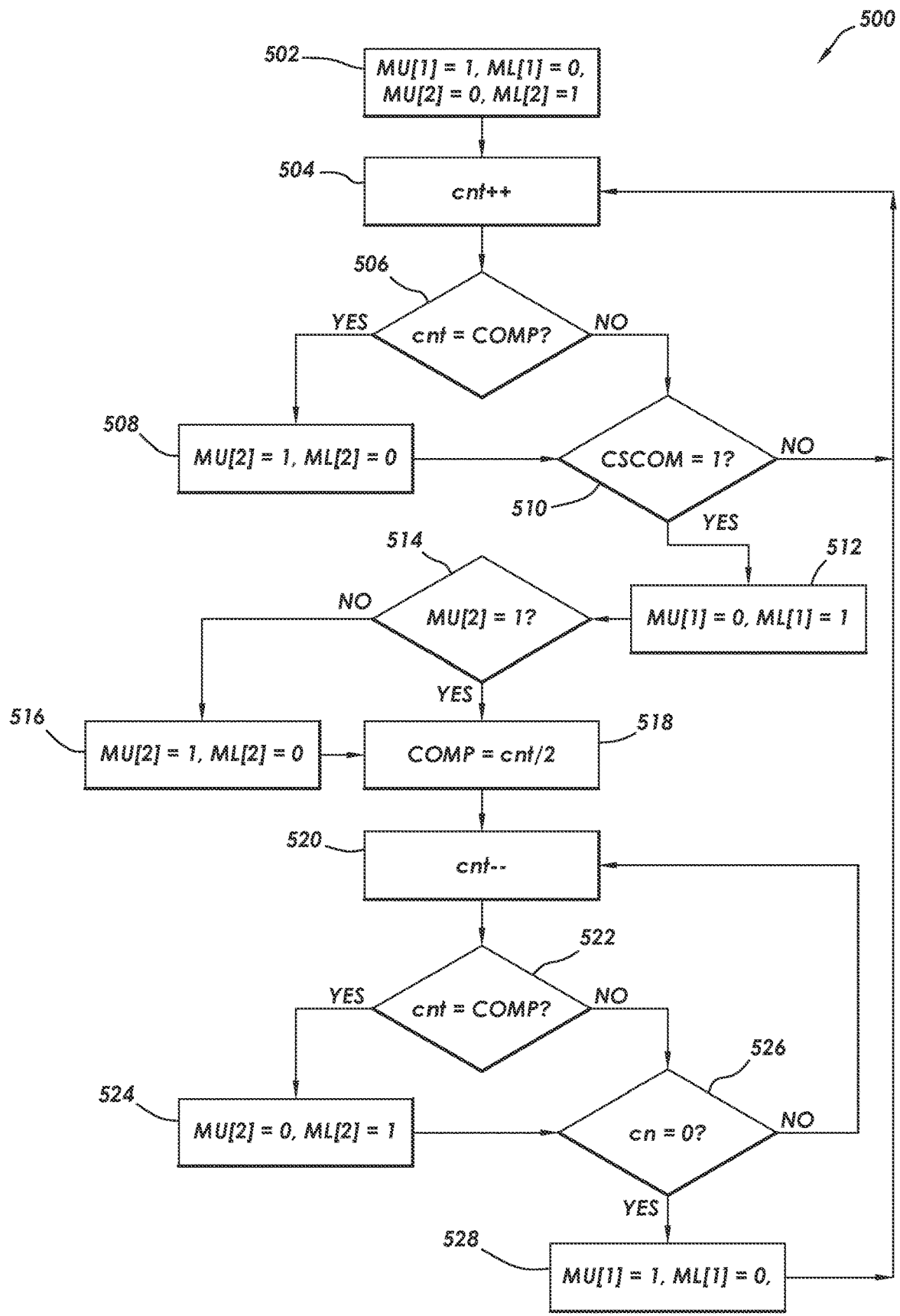
FIG. 5 is a flow diagram of an example of a method for generating signals to drive the stages of an interleaved resonant power converter in accordance with some implementations.

FIG. 5 is a flow diagram of an example of a method 500 for generating signals to drive the stages of the interleaved resonant power converter 102. To start, the pulse-width modulator 304 sets initial values for both pairs of complementary signals. For example, at block 502, the pulse-width modulator 304 sets signal MU[1] to "1", signal ML[1] to "0", signal MU[2] to "0", and signal ML[2] to "1". At block 504, the pulse-width modulator 304 increments a counter cnt. For example, the pulse-width modulator 304 may increment the value of the counter cnt from "0" to "1". At block 506, the pulse-width modulator 304 determines whether the value of the counter cnt is equal to a counter threshold COMP. When the value of the counter cnt equals the counter threshold COMP, the pulse-width modulator 304 switches the pair of complementary signals for the slave stage 108. For example, the pulse-width modulator 304 sets signal MU[2] to "1" and signal ML[2] to "0" at block 508. Alternatively, when the value of the counter cnt does not equal the counter threshold COMP, the pulse-width modulator 304 determines whether the current-mode control signal CSCOM is pulsing. For example, at block 510, the pulse-width modulator 304 determines whether the current-mode control signal CSCOM is equal to "1" (which indicates that the current-mode control signal CSCOM is pulsing). As described above, the current-mode control signal CSCOM pulses when the current sense signal Vcs substantially equals the feedback voltage Vfeed. When the current-mode control signal CSCOM is not pulsing (i.e., the current sense signal Vcs is less than the feedback voltage Vfeed), the pulse-width modulator 304 increments the counter cnt again at block 504. For example, the pulse-width modulator 304 may increment the value of the counter cnt from "1" to "2". Alternatively, when the current-mode control signal CSCOM is pulsing, the pulse-width modulator 304 switches the pair of complementary signals for the master stage 106. For example, the pulse-width modulator 304 sets signal MU[1] to "0" and signal ML[1] to "1" at block 512. At block 514, the pulse-width modulator 304 determines whether the signal MU[2] is set to "1". When signal MU[2] is not set to "1", the pulse-width modulator 304 sets signal MU[2] equal to "1" and sets signal ML[2] equal to 0 at block 516. Alternatively, when the signal MU[2] is equal to 1 (or after block 516, the pulse-width modulator 304 sets the counter threshold COMP based on the current value of the counter cnt at block 518. In some implementations, the pulse-width modulator 304 sets the counter threshold COMP based on a number of stages included in the interleaved resonant power converter 102. For example, when the interleaved resonant power converter 102 includes two stages, the pulse-width modulator 304 may set the counter threshold COMP to one-half of the value of the counter cnt to achieve phase shift of 90° between the master stage 106 and the slave stage 108. As a specific example, the pulse-width modulator 304 may set the counter threshold COMP to "5" when the current-mode control signal CSCOM pulses and the value of the counter cnt is "10". At block 520, the pulse-width modulator 304 decrements the counter cnt. For example, the pulse-width modulator 304 may decrement the value of the counter cnt from "10" to "9". At block 522, the pulse-width modulator 304 determines whether the value of the counter cnt is equal to the counter threshold COMP. When the value of the counter cnt equals the counter threshold COMP, the pulse-width modulator 304 switches the pair of complementary signals for the slave stage 108. For example, the pulse-width modulator 304 sets signal MU[2] to "0" and signal ML[2] to "1" at block 524. Alternatively, when the value of the counter cnt does not equal the counter threshold COMP (or after block 524), the pulse-width modulator 304 determines whether the value of the counter cnt is equal to zero at block 526. When the value of the counter cnt is not equal to zero, the pulse-width modulator 304 decrements the counter cnt again at block 520. For example, the pulse-width modulator 304 may decrement the value of the counter cnt from "9" to "8". Alternatively, when the value of the counter cnt is equal to zero, the pulse-width modulator 304 switches the pair of complementary signals for the master stage 106. For example, the pulse-width modulator 304 sets signal MU[1] to "1" and signal ML[1] to "0" at block 528. After block 528, the method 500 returns to block 504 and the pulse-width modulator 304 increments the counter cnt again. For example, the pulse-width modulator 304 may increment the value of the counter cnt from "0" to "1".

Returning to FIG. 4, the bottom portion illustrates how the pulse-width modulator 304 sets the switching frequency of the pair of complementary signals for the master stage 106 based on the current-mode control signal CSCOM and sets the switching frequency of the pair of complementary signals for the slave stage 108 to match the switching frequency of the pair of complementary signals for the master stage 106. For example, at time t0 in FIG. 4, the counter cnt starts counting upward. At time t1, the counter cnt equals the counter threshold COMP and the pair of complementary signals for the slave stage 108 (i.e., signals MU[2] and ML[2]) are switched. At time t2, the current-mode control signal CSCOM pulses because the current sense signal Vcs equals the feedback voltage Vfeed. Also, at time t2, the pair of complementary signals for the master stage 106 (i.e., signals MU[1] and ML[1]) are switched and the counter cnt starts counting downward. At time t3, the counter cnt equals the counter threshold COMP again and the pair of complementary signals for the slave stage 108 (i.e., signals MU[2] and ML[2]) are switched. At time t4, the counter cnt equals zero and the pair of complementary signals for the master stage 106 (i.e., signals MU[1] and ML[1]) are switched. In addition, at time t4, the counter cnt starts counting upward again. In this manner, the switching frequencies of the pairs of complementary signals for the master stage 106 and the slave stage 108 match each other and provide a 90° phase shift between the master stage 106 and the slave stage 108.

Figure 4:
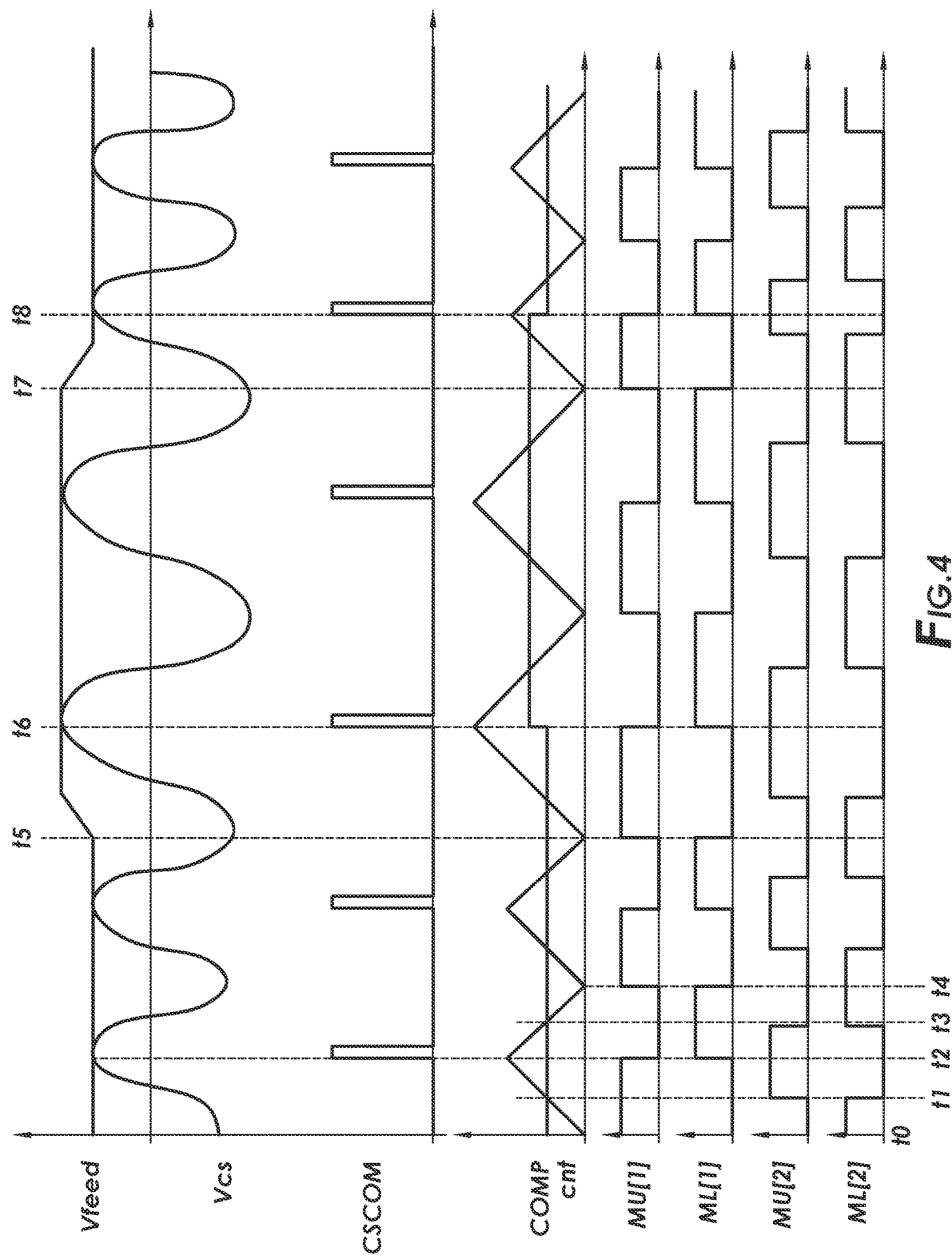
FIG. 4 is a timing diagram of example operation of a two-stage interleaved resonant power converter in accordance with some implementations.

FIG. 4 also illustrates how the pulse-width modulator 304 adjusts the switching frequency of the pair of complementary signal for the master stage 106 based on the current-mode control signal CSCOM (e.g., to account for load current changes) and adjusts the switching frequency of the pair of complementary signal for the slave stage 108 to match the switching frequency of the pair of complementary signal for the master stage 106. As a first example, at time t5 in FIG. 4, the load current changes as indicated by a rise in the feedback voltage Vfeed. Subsequently, when the current-mode control signal CSCOM pulses at time t6, the current value of the counter cnt is higher than the peak value during the previous cycle because it takes a longer amount of time for the current sense signal Vcs to match the new higher feedback voltage Vfeed. This higher peak value of the counter cnt causes an increase in the time between switching the values of the pair of complementary signals for the master stage 106. Further, because the counter threshold COMP is set based on the most recent peak value of the counter cnt, the time between switching the values of the pair of complementary signals for the slave stage 108 also increases. Thus, the switching frequencies of the pairs of complementary signals decrease while but still match each other. As a second example, at time t7, the load current changes again as indicated by a fall in the feedback voltage Vfeed. Subsequently, when the current-mode control signal CSCOM pulses at time t8, the current value of the counter cnt is lower than the peak value during the previous cycle because it takes a shorter amount of time for the current sense signal Vcs to match the new lower feedback voltage Vfeed. This lower peak value of the counter cnt causes a decrease in the time between switching the values of the pair of complementary signals for the master stage 106. Further, because the counter threshold COMP is set based on the most recent peak value of the counter cnt, the time between switching the values of the pair of complementary signals for the slave stage 108 also decreases. Thus, the switching frequencies of the pairs of complementary signals increase while but again still match each other.

Figure 6:
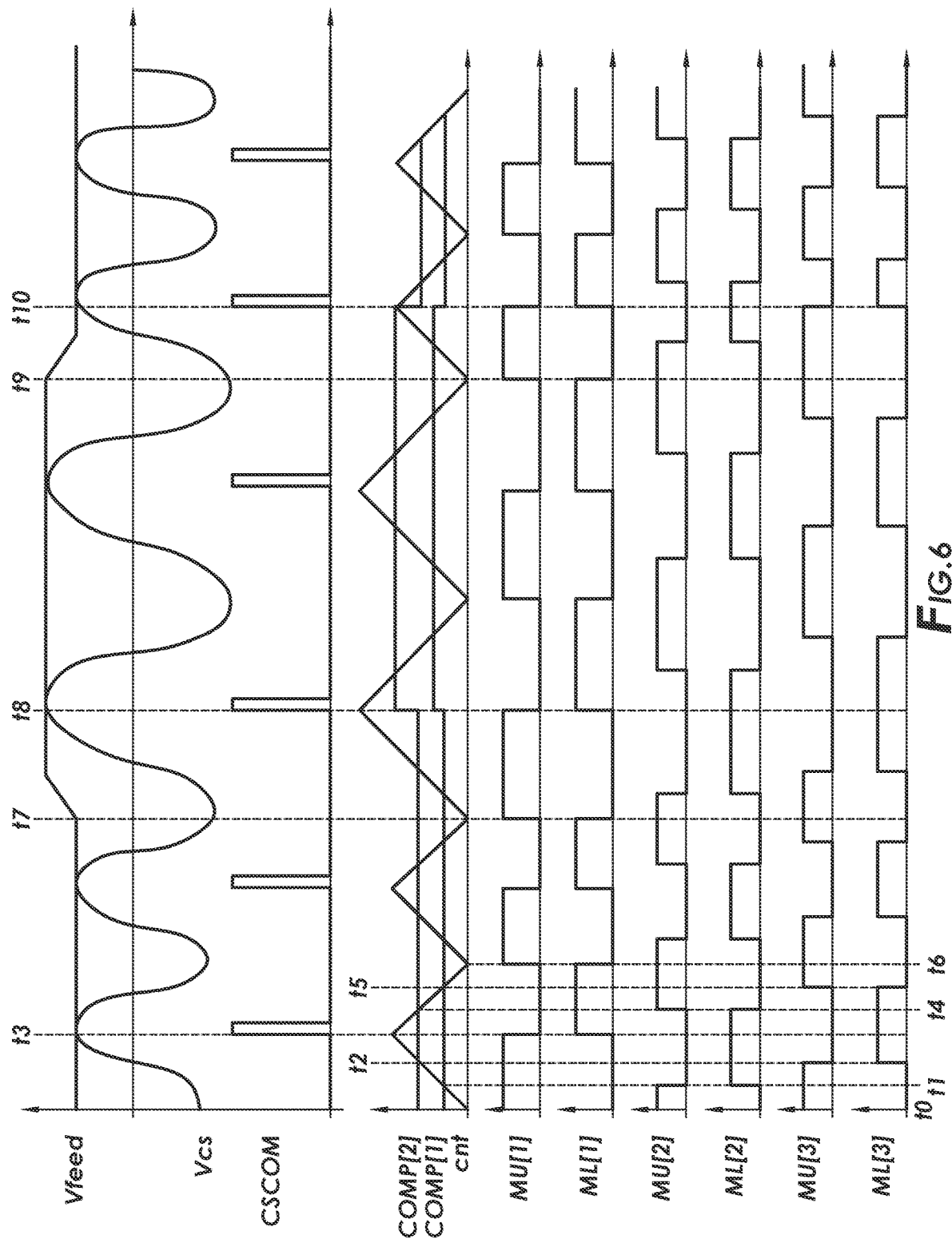
FIG. 6 is a timing diagram of example operation of a three-stage interleaved resonant power converter in accordance with some implementations.

In some implementations, the interleaved resonant power converter 102 includes more than one slave stage. For example, FIG. 6 is an example of a timing diagram for an implementation of the interleaved resonant power converter 102 that includes two slave stages. As illustrated in FIG. 6, the phase shift between each stage is 120°. To implement the 120° phase shift between each stage, the pulse-width modulator 304 may use separate counter thresholds for each slave stage (e.g., COMP[1] and COMP[2]). At time t0 in FIG. 6, the counter cnt starts counting upward. At time t1, the counter cnt equals the counter threshold COMP[1] for one of the slave stages and the pair of complementary signals for that slave stage (i.e., signals MU[2] and ML[2]) are switched. At time t2, the counter cnt equals the counter threshold COMP[2] for the other slave stage and the pair of complementary signals for that slave stage (i.e., signals MU[3] and ML[3]) are switched. At time t3, the current-mode control signal CSCOM pulses because the current sense signal Vcs equals the feedback voltage Vfeed. Also, at time t3, the pair of complementary signals for the master stage 106 (i.e., signals MU[1] and ML[1]) are switched and the counter cnt starts counting downward. At time t4, the counter cnt equals the counter threshold COMP[2] again and the pair of complementary signals for that slave stage (i.e., signals MU[3] and ML[3]) are switched. At time t5, the counter cnt equals the counter threshold COMP[1] again and the pair of complementary signals for that slave stage (i.e., signals MU[2] and ML[2]) are switched. At time t6, the counter cnt equals zero and the pair of complementary signals for the master stage 106 (i.e., signals MU[1] and ML[1]) are switched. In addition, at time t6, the counter cnt starts counting upward again. Similar to implementations with one slave stage, implementations with two slave stages, the switching frequencies of the pairs of complementary signals for all three stages match each other and provide a 120° phase shift between each other.

FIG. 6 also illustrates how the pulse-width modulator 304 may adjust the switching frequency of the pair of complementary signal for the master stage 106 based on the current-mode control signal CSCOM (e.g., to account for load current changes) and may adjust the switching frequency of the pairs of complementary signal for the two slave stages to match the switching frequency of the pair of complementary signal for the master stage 106. As a first example, at time t5 in FIG. 4, the load current changes as indicated by a rise in the feedback voltage Vfeed. Subsequently, when the current-mode control signal CSCOM pulses at time t6, the current value of the counter cnt is higher than the peak value during the previous cycle because it takes a longer amount of time for the current sense signal Vcs to match the new higher feedback voltage Vfeed. This higher peak value of the counter cnt causes an increase in the time between switching the values of the pair of complementary signals for the master stage 106. Further, because the counter threshold COMP is set based on the most recent peak value of the counter cnt, the time between switching the values of the pair of complementary signals for the slave stage 108 also increases. Thus, the switching frequencies of the pairs of complementary signals all decrease but still match each other. As a second example, at time t7, the load current changes again as indicated by a fall in the feedback voltage Vfeed. Subsequently, when the current-mode control signal CSCOM pulses at time t8, the current value of the counter cnt is lower than the peak value during the previous cycle because it takes a shorter amount of time for the current sense signal Vcs to match the new lower feedback voltage Vfeed. This lower peak value of the counter cnt causes a decrease in the time between switching the values of the pair of complementary signals for the master stage 106. Further, because the counter threshold COMP is set based on the most recent peak value of the counter cnt, the time between switching the values of the pair of complementary signals for the slave stage 108 also decreases. Thus, the switching frequencies of the pairs of complementary signals also increase while but again still match each other.

As a first example, at time t7 in FIG. 6, the load current changes as indicated by a rise in the feedback voltage Vfeed. Subsequently, when the current-mode control signal CSCOM pulses at time t8, the current value of the counter cnt is higher than the peak value during the previous cycle and both of the counter thresholds COMP[1] and COMP[2] increase to account for the higher new peak value. Thus, the switching frequencies of the pairs of complementary signals all decrease but still match each other. As a second example, at time t9, the load current changes again as indicated by a fall in the feedback voltage Vfeed. Subsequently, when the current-mode control signal CSCOM pulses at time t10, the current value of the counter cnt is lower than the peak value during the previous cycle and both of the counter thresholds COMP[1] and COMP[2] decrease to account for the lower new peak value. Thus, the switching frequencies of the pairs of complementary signals all increase but again still match each other.

Figure 7:
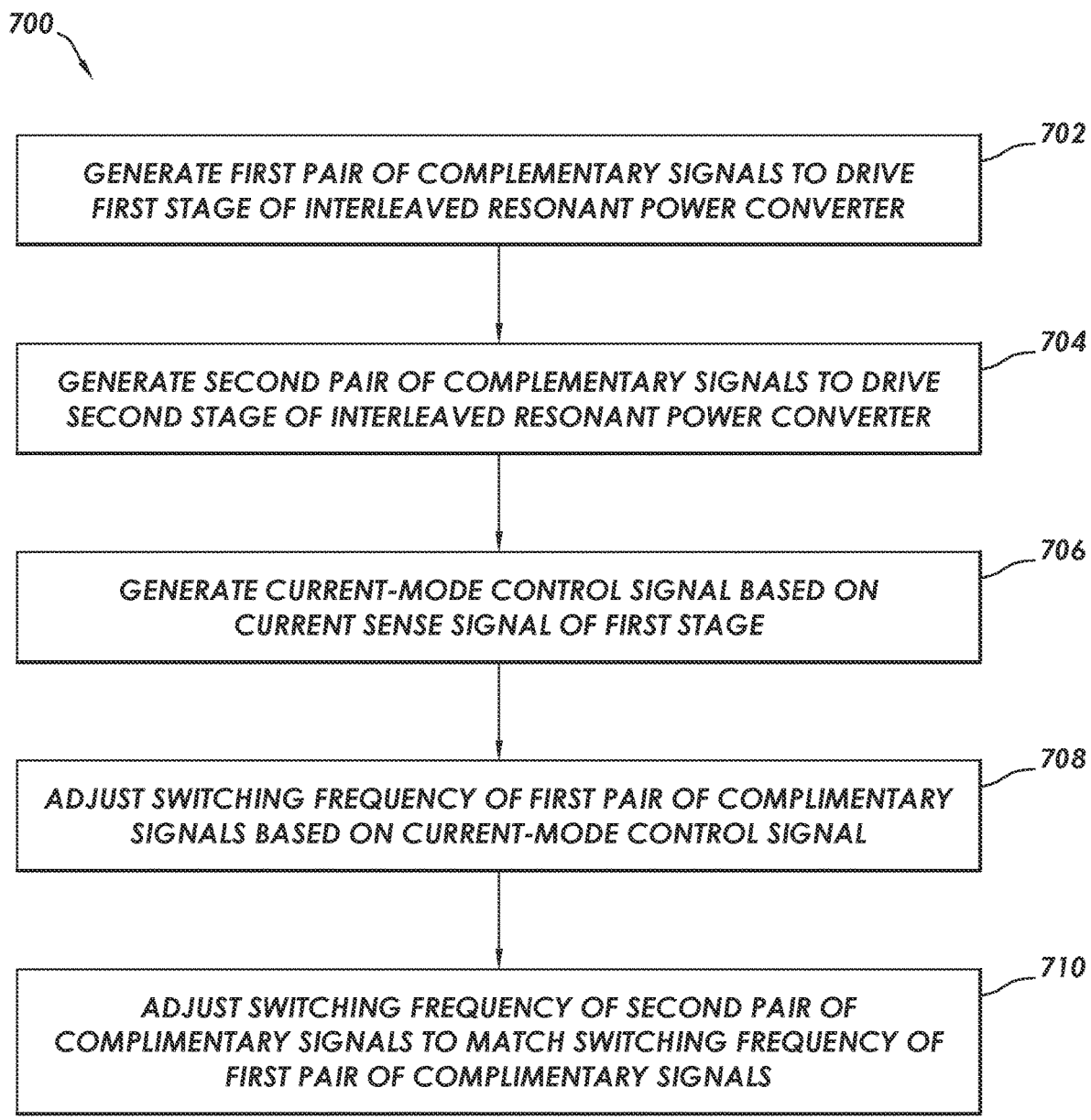
FIG. 7 is a flow diagram of an example of a method for operating an interleaved resonant power converter in accordance with some implementations.

FIG. 7 is a flow diagram of an example of a method for operating the interleaved resonant power converter 102 in accordance with some implementations. At block 702, a first pair of complementary signals is generated to drive a first stage of the interleaved resonant power converter 102. For example, the controller 104 (or more particularly, pulse-width modulator 304) may generate signals MU[1] and MU[1] to drive the master stage 106 of the interleaved resonant power converter 102 (one example of a "first stage"). At block 704, a second pair of complementary signals is generated to drive a second stage of the interleaved resonant power converter 102. For example, the controller 104 (or more particularly, pulse-width modulator 304) may generate signals MU[2] and MU[2] to drive the slave stage 108 of the interleaved resonant power converter 102 (one example of a "second stage"). At block 706, a current-mode control signal is generated based on a current sense signal of the first stage. For example, as described above, the current-mode control signal CSCOM may pulse when the voltage of the current sense signal Vcs of the master stage 106 is substantially equal to the feedback voltage Vfeed. In some implementations, the controller 104 (or more particularly, error amplifier 306) may generate the feedback voltage Vfeed by comparing a reference voltage Vref to the output voltage Vout produced by the interleaved resonant power converter 102. At block 708, a switching frequency of the first pair of complementary signals is adjusted based on the current-mode control signal. For example, the controller 104 (or more particularly, pulse-width modulator 304) may adjust the pair of complementary signals for the master stage 106 (i.e., signals MU[1] and ML[1]) based on the current-mode control signal CSCOM in accordance with the methods described above in relation to FIGS. 4 and 5. At block 710, a switching frequency of the second pair of complementary signals is adjusted based on the current-mode control signal. For example, in two-stage implementations of the interleaved resonant power converter 102, the controller 104 (or more particularly, pulse-width modulator 304) may adjust the pair of complementary signals for the slave stage 108 (i.e., signals MU[2] and ML[2]) based on the current-mode control signal CSCOM in accordance with the methods described above in relation to FIGS. 4 and 5. Additionally, in three-stage implementations of the interleaved resonant power converter 102, the controller 104 (or more particularly, pulse-width modulator 304) may adjust the pair of complementary signals for one of the slave stages (i.e., either signals MU[2] and ML[2] or signals MU[3] and ML[3]) based on the current-mode control signal CSCOM in accordance with the methods described above in relation to FIG. 6.

Figure 8:
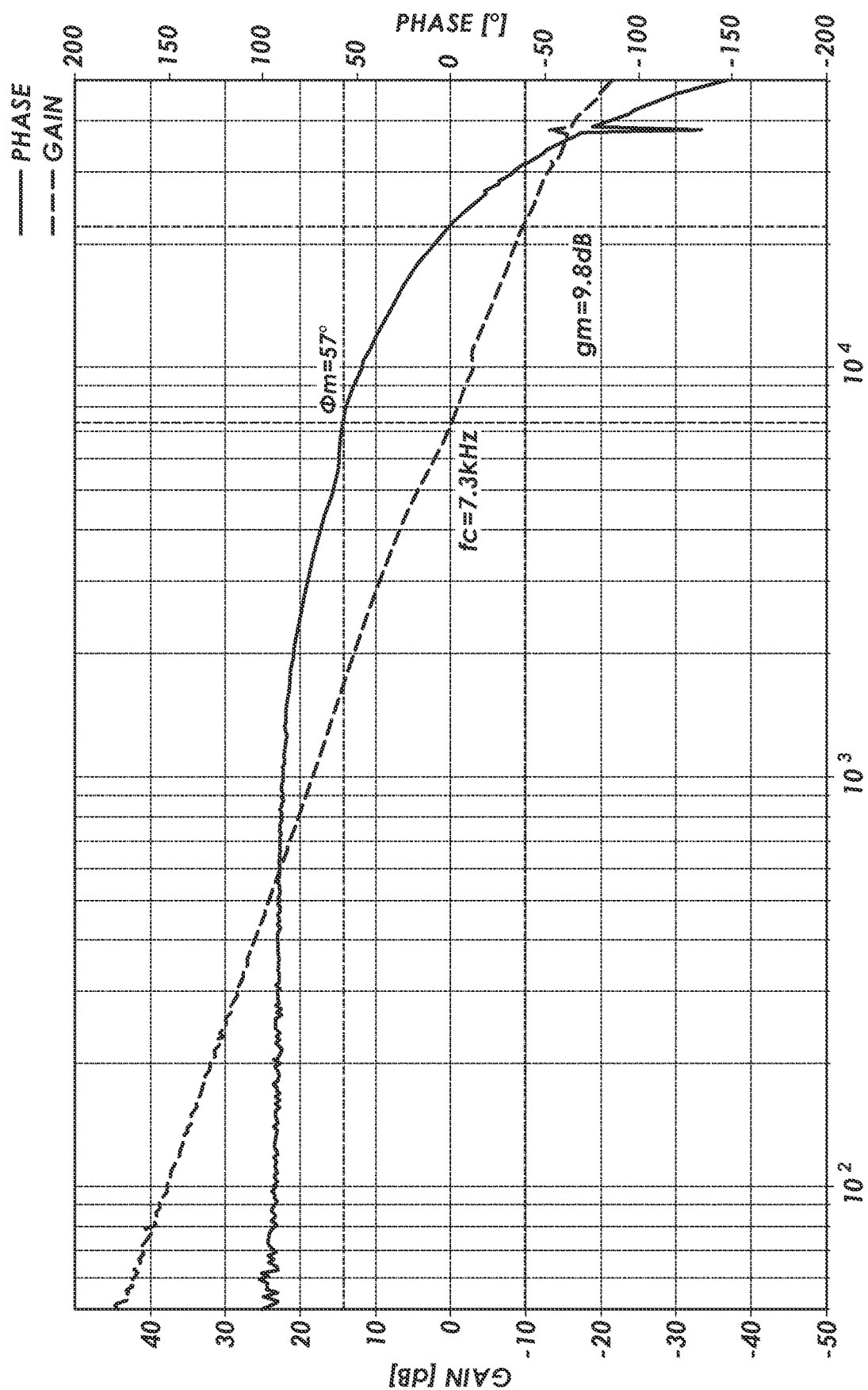
FIG. 8 is a bode plot of an example of gain and phase characteristics for an interleaved resonant power converter in accordance with some implementations.
Figure 9:
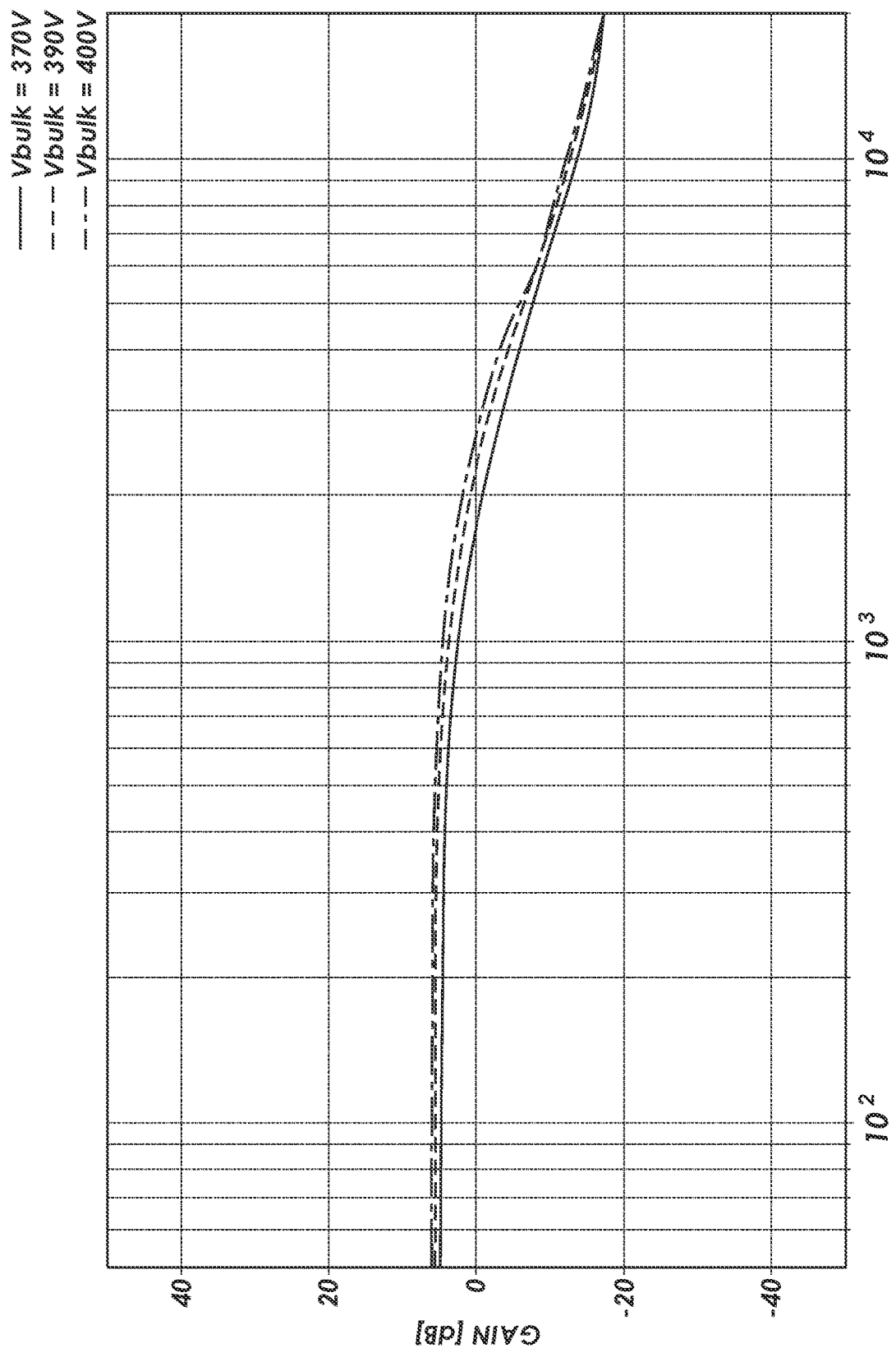
FIG. 9 is a plot of examples of gain characteristics for an interleaved resonant power converter at different input voltages in accordance with some implementations.
Figure 10:
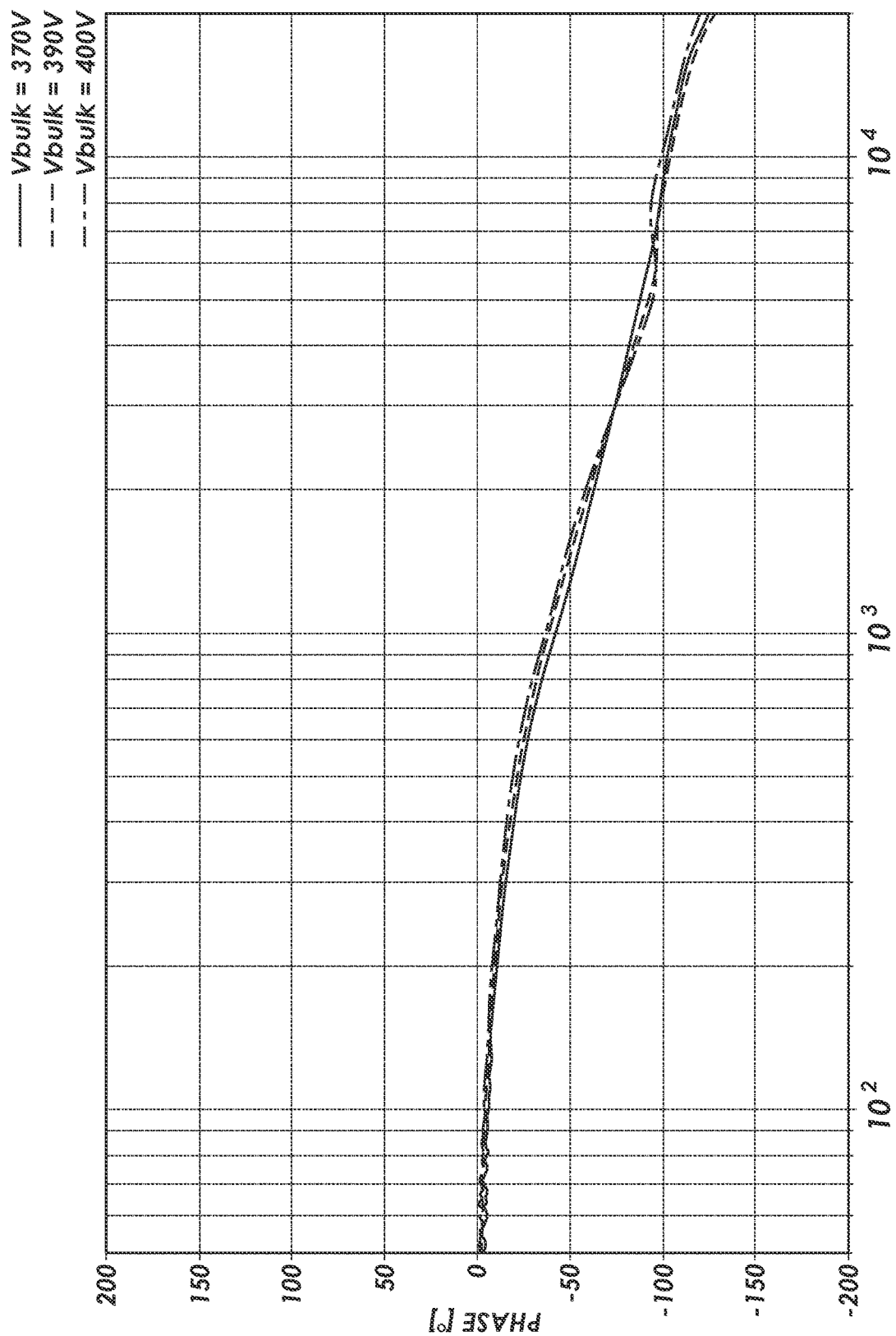
FIG. 10 is a plot of examples of phase characteristics for an interleaved resonant power converter at different input voltages in accordance with some implementations.
Figure 11:
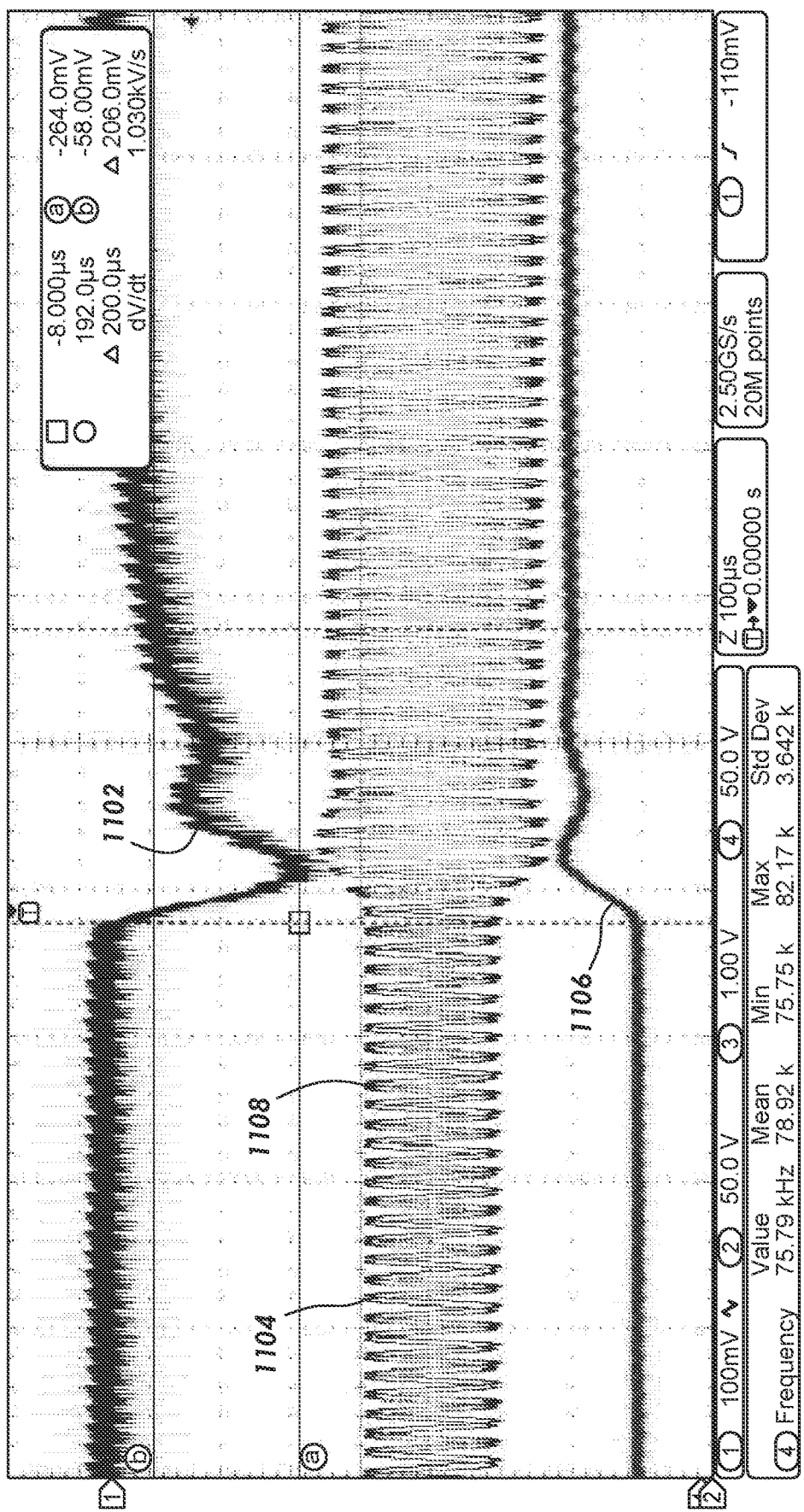
FIG. 11 is a plot of an example of a transient response of an interleaved resonant power converter in accordance with some implementations.

FIG. 8 is a bode plot of an example of gain and phase characteristics for the interleaved resonant power converter 102 when the input voltage Vbulk is 390 Volts. The crossover frequency in FIG. 8 is 7.3 KHz with a 57° phase margin and a 9.8 dB gain margin. As illustrated in in FIG. 8, the gain characteristic has only one pole. FIG. 9 is a plot of examples of gain characteristics when different input voltages are applied to the interleaved resonant power converter 102. FIG. 10 is a plot of examples of phase characteristics when different input voltages are applied to the interleaved resonant power converter 102. As illustrated in FIG. 9, pole placement does not vary dependent on the input voltage Vbulk of the interleaved resonant power converter 102. FIG. 8 shows phase and gain characteristics of the whole system (i.e., the power stage and the regulator) whereas FIGS. 9 and 10 show gain and phase characteristics of a system without a regulator. FIG. 11 is a plot of an example of a transient response of the interleaved resonant power converter 102. The voltage drop in FIG. 11 is 264 millivolts for transient from 20 Amps to 40 Amps (from half to full) load and the input voltage Vbulk is 390 Volts. In FIG. 11, waveform 1102 is the output voltage Vout, waveform 1104 is the resonant capacitor voltage of the master stage 106, waveform 1106 is the feedback voltage Vfeed, and waveform 1108 is the resonant capacitor voltage of the slave stage 108.

The present disclosure also provides an apparatus for power conversion. The apparatus includes means for generating a first pair of complementary signals to drive a first stage of an interleaved resonant power converter 102. The means for generating the first pair of complementary signals may refer, e.g., to the controller 104 as a whole or one or more components of the controller 104 (e.g., the pulse-width modulator 304). The apparatus also includes means for generating a second pair of complementary signals to drive a second stage of an interleaved resonant power converter 102. The means for generating the second pair of complementary signals may refer, e.g., to the controller 104 as a whole or one or more components of the controller 104 (e.g., the pulse-width modulator 304). The apparatus further includes means for generating a current-mode control signal CSCOM based on a current sense signal Vcs of the first stage. The means for generating the current-mode control signal CSCOM may refer, e.g., to the controller 104 as a whole or one or more components of the controller 104, or the current-mode controller 302 as a whole or one or more components of the current-mode controller 302 (e.g., error amplifier 306, comparator 308, compensator 310, or a combination thereof). The apparatus also includes means for adjusting a switching frequency of the first pair of complementary signals based on the current-mode control signal CSCOM. The means for adjusting the switching frequency of the first pair on complementary signal may refer, e.g., to the controller 104 as a whole or one or more components of the controller 104 (e.g., the pulse-width modulator 304). The apparatus further includes means for adjusting a switching frequency of the second pair of complementary signals to match the switching frequency of the first pair of complementary signals. The means for adjusting the switching frequency of the second pair on complementary signal may refer, e.g., to the controller 104 as a whole or one or more components of the controller 104 (e.g., the pulse-width modulator 304).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. A method for operating an interleaved resonant power converter, the method comprising:
   generating a first pair of complementary signals to drive a first stage of the interleaved resonant power converter;
   generating a second pair of complementary signals to drive a second stage of the interleaved resonant power converter;
   generating a current-mode control signal based on a current sense signal of the first stage;
   adjusting a switching frequency of the first pair of complementary signals based on the current-mode control signal; and
   adjusting a switching frequency of the second pair of complementary signals to match the switching frequency of the first pair of complementary signals,
   wherein adjusting the switching frequency of the first pair of complementary signals based on the current-mode control signal includes:
   switching values of the first pair of complementary signals when the current-mode control signal pulses.

2. The method of claim 1, wherein adjusting the switching frequency of the first pair of complementary signals based on the current-mode control signal further includes:
   starting to increment a counter when the counter is equal to zero,
   starting to decrement the counter when the current-mode control signal pulses, and
   switching the values of the first pair of complementary signals when the counter is equal to zero.

3. The method of claim 2, wherein adjusting the switching frequency of the second pair of complementary signals to match the switching frequency of the first pair of complementary signals further includes:
   setting a counter threshold based on a value of the counter when the current-mode control signal pulses, and
   switching values of the second pair of complementary signals when the value of the counter is equal to the counter threshold.

4. The method of claim 3, wherein setting the counter threshold further includes setting the counter threshold based on a number of stages included in the interleaved resonant power converter.

5. The method of claim 3, wherein setting the counter threshold further includes setting the counter threshold to one-half of the value of the counter when the current-mode control signal pulses.

6. The method of claim 3, wherein the counter threshold is a first counter threshold, and wherein the method further comprises:
   generating a third pair of complementary signals to drive a third stage of the interleaved resonant power converter;
   setting a second counter threshold based on the value of the counter when the current-mode control signal pulses; and
   switching the third pair of complementary signals when the value of the counter is equal to the second counter threshold.

7. The method of claim 6,
wherein setting the first counter threshold further includes setting the first counter threshold to one-third of the value of the counter when the current mode control signal pulses, and
wherein setting the second counter threshold further comprises setting the second counter threshold to two-thirds of the value of the counter when the current-mode control signal pulses.

8. The method of claim 1, wherein generating the current-mode control signal based on a current sense signal of the first stage further includes:
generating a feedback voltage based on an output voltage produced by the interleaved resonant power converter, and
pulsing the current-mode control signal when a voltage of the current sense signal is equal to the feedback voltage.

9. A system for power conversion, comprising:
an interleaved resonant power converter including at least a first stage and a second stage; and
a controller configured to:
generate a first pair of complementary signals to drive the first stage,
generate a second pair of complementary signals to drive the second stage,
generate a current-mode control signal based on a current sense signal of the first stage,
adjust a switching frequency of the first pair of complementary signals based on the current-mode control signal, and
adjust a switching frequency of the second pair of complementary signals to match the switching frequency of the first pair of complementary signals,
wherein, to generate a current-mode control signal based on the current sense signal of the first stage, the controller is further configured to:
generate a feedback voltage based on an output voltage produced by the interleaved resonant power converter, and
pulse the current-mode control signal when a voltage of the current sense signal is equal to the feedback voltage.

10. The system of claim 9, wherein, to adjust the switching frequency of the first pair of complementary signals based on the current-mode control signal, the controller is further configured to:
start to increment a counter when the counter is equal to zero,
switch values of the first pair of complementary signals when the current-mode control signal pulses,
start to decrement the counter when the current-mode control signal pulses, and switch the values of the first pair of complementary signals when the counter is equal to zero.

11. The system of claim 10, wherein, to adjust the switching frequency of the second pair of complementary signals to match the switching frequency of the first pair of complementary signals, the controller is further configured to:
set a counter threshold based on a value of the counter when the current-mode control signal pulses, and
switch values of the second pair of complementary signals when the value of the counter is equal to the counter threshold.

12. The system of claim 11, wherein the controller is further configured to set the counter threshold based on a number of stages included in the interleaved resonant power converter.

13. The system of claim 11, wherein, to set the counter threshold, the controller is further configured to set the counter threshold to one-half of the value of the counter when the current-mode control signal pulses.

14. The system of claim 11, wherein the counter threshold is a first counter threshold, and wherein the controller is further configured to:
generate a third pair of complementary signals to drive a third stage of the interleaved resonant power converter,
set a second counter threshold based on the value of the counter when the current-mode control signal pulses, and
switch the third pair of complementary signals when the value of the counter is equal to the second counter threshold.

15. The system of claim 14, wherein, to set the first counter threshold, the controller is further configured to set the first counter threshold to one-third of the value of the counter when the current-mode control signal pulses, and wherein, to set the second counter threshold, the controller is further configured to set the second counter threshold to two-thirds of the value of the counter when the current-mode control signal pulses.

16. An apparatus for power conversion, comprising:
a controller configured to:
generate a first pair of complementary signals to drive a first stage of an interleaved resonant power converter;
generate a second pair of complementary signals to drive a second stage of an interleaved resonant power converter;
generate a current-mode control signal based on a current sense signal of the first stage;
adjust a switching frequency of the first pair of complementary signals based on the current-mode control signal; and
adjust a switching frequency of the second pair of complementary signals to match the switching frequency of the first pair of complementary signals,
wherein generating the current mode control signal comprises:
generating a feedback voltage based on an output voltage produced by the interleaved resonant power converter, and
pulsing the current-mode control signal when a voltage of the current sense signal is equal to the feedback voltage.

17. The apparatus of claim 16, wherein the current-mode control signal pulses when the current sense signal is at a peak level.

18. The apparatus of claim 16, wherein the controller comprises a comparator that is configured to output the current-mode control signal in response to the current sense signal.

19. The apparatus of claim 16, the current-mode control signal is non-sinusoidal and the current sense signal is sinusoidal.

20. An apparatus for power conversion, comprising:
a controller configured to:
generate a first pair of complementary signals to drive a first stage of an interleaved resonant power converter;

generate a second pair of complementary signals to drive a second stage of an interleaved resonant power converter;
generate a current-mode control signal based on a current sense signal of the first stage;
adjust a switching frequency of the first pair of complementary signals based on the current-mode control signal; and
adjust a switching frequency of the second pair of complementary signals to match the switching frequency of the first pair of complementary signals,
wherein adjusting the switching frequency of the first pair of complementary signals comprises:
starting to increment a counter when the counter is equal to zero,
switching values of the first pair of complementary signals when the current-mode control signal pulses,
starting to decrement the counter when the current-mode control signal pulses, and
switching the values of the first pair of complementary signals when the counter is equal to zero.

21. The apparatus of claim 20, wherein adjusting the switching frequency of the second pair of complementary signals comprises:
setting a counter threshold based on a value of the counter when the current-mode control signal pulses, and
switching values of the second pair of complementary signals when the value of the counter is equal to the counter threshold.

* * * * *